United States Patent [19]

Hrabie et al.

[11] Patent Number: 5,683,668
[45] Date of Patent: Nov. 4, 1997

[54] METHOD OF GENERATING NITRIC OXIDE GAS USING NITRIC OXIDE COMPLEXES

[75] Inventors: Joseph A. Hrabie, Frederick; Larry K. Keefer, Bethesda, both of Md.

[73] Assignee: The United States of America as represented by the Department of Health and Human Services, Washington, D.C.

[21] Appl. No.: 522,405

[22] PCT Filed: Mar. 12, 1993

[86] PCT No.: PCT/US93/02374

§ 371 Date: Feb. 2, 1996

§ 102(e) Date: Feb. 2, 1996

[87] PCT Pub. No.: WO94/20415

PCT Pub. Date: Sep. 15, 1994

Related U.S. Application Data

[60] Continuation-in-part of Ser. No. 906,479, Jun. 30, 1992, Pat. No. 5,250,550, which is a division of Ser. No. 585,793, Sep. 20, 1990, Pat. No. 5,155,137.

[51] Int. Cl.$^6$ .................................................. C01B 21/24
[52] U.S. Cl. ...................... 423/405; 534/552; 534/556; 534/569; 570/206
[58] Field of Search ........................... 423/400, 405

[56] References Cited

U.S. PATENT DOCUMENTS

| 4,256,462 | 3/1981 | Frank et al. | 23/230 |
| 4,303,419 | 12/1981 | Frank et al. | 55/185 |
| 5,155,137 | 10/1992 | Keefer et al. | 514/611 |

FOREIGN PATENT DOCUMENTS

| 900978 | 10/1990 | WIPO . |
| 9205149 | 4/1992 | WIPO . |
| 9420415 | 9/1994 | WIPO . |

OTHER PUBLICATIONS

Maragos et al. "Complexes of •NO with Nucleophiles as Agents for the Controlled Biological Release of Nitric Oxide Vasorelaxant Effects" Apr. 3, 1991. pp. 3242–3247, Journal of Medicinal Chemistry vol. 34.

*Primary Examiner*—Wayne Langel
*Attorney, Agent, or Firm*—Leydig, Voit & Mayer, Ltd.

[57] ABSTRACT

The present invention provides a method for the generation of NO gas by exposing zwitterionic polyamine-nitric oxide adducts of the formula $RN[N(O)NO^-](CH_2)_xNH_2^+R'$, wherein $R = C_1-C_6$ alkyl, $C_1-C_6$ aminoalkyl, or cyclohexy, $R' =$ hydrogen or $C_1-C_6$ alkyl, and $x = 2-6$, to suitable conditions to effect the release of NO, such as by contact with a mildly acidic solvent or water of neutral or slightly alkaline pH.

12 Claims, 1 Drawing Sheet

METHOD OF GENERATING NITRIC OXIDE GAS USING NITRIC OXIDE COMPLEXES

This is a continuation of PCT application Ser. No. US/93/02374, filed on Mar. 12, 1993, which is a continuation-in-part of U.S. Ser. No. 07/906,479, filed Jun. 30, 1992, now U.S. Pat. No. 5,250,550, which is a division of U.S. Ser. No. 07/585,793, filed Sep. 20, 1990, now U.S. Pat. No. 5,155,137.

TECHNICAL FIELD OF THE INVENTION

The present invention relates to the generation of nitric oxide gas using solid complexes of nitric oxide, in particular zwitterionic polyamine-nitric oxide adducts.

BACKGROUND OF THE INVENTION

Nitric oxide (NO) has many important uses in biological, pharmaceutical, chemical, and industrial applications. For example, NO is a key bioregulatory molecule that plays critical roles in the regulation of various biological processes, including the normal physiological control of blood pressure, macrophage-induced cytostasis and cytotoxicity, inhibition of platelet aggregation, and neurotransmission (Moncada et al., *Pharmacological Reviews*, 43(2), 109–142 (1991)). Many diseases, such as endotoxic shock, ischemia reperfusion injury, genetic mutations, cancer, male impotence, and atherosclerosis have been suggested to be caused by defects in the production and/or regulation of NO (Moncada et al., supra; Masini et al., *Agents and Action*, 33, 53–56 (1991)). The use of NO-releasing compounds in the treatment of hypertension and other cardiovascular disorders is disclosed in U.S. Pat. No. 4,954,526, which corresponds to WO 92/05149, U.S. Pat. Nos. 5,039,705, and 5,155,137.

In addition to its role as an important bioeffector molecule, NO has many other uses, particularly in chemical and industrial applications. NO is used extensively in both the laboratory and the industrial plant. For example, NO gas is used to directly effect desired chemical results, and the NO radical is involved in the formation of diazotizing/ nitrosating agents, which are used to achieve a variety of chemical results.

Free NO gas is used in the preparation of nitric acid, nitrosyl chloride, metal nitrosyls, and caprolactam, which, in turn, is used in the synthesis of nylon (McCleverty, *Chem. Rev.*, 79, 53–76 (1979)). NO gas can be used to produce aryl bromides from aryl amines by a procedure which was developed as an alternative to traditional Sandmeyer reaction (Brackman and Smit, *Recl. Tray. Chim. Pays-Bas*, 85, 857–864 (1966)). The NO gas is used to produce cuptic bromide nitrosyl in situ, which converts the amine to a diazonium salt and then to the bromide. NO is also used commercially as a polymerization inhibitor during the preparation of olefins (U.S. Pat. No. 4,040,912 and French Patent 2,478,648) and to improve the properties of various polymers (German Patent 2,216,844). There are numerous other potential chemical and industrial uses of NO, such as the synthesis of dyes via diazonium salts (Brackman and Smit, supra).

The potential uses of NO undoubtedly have been limited by the fact that NO is a highly poisonous and reactive gas. It is a strong irritant to the skin and mucous membranes. Moreover, NO is difficult to store in compact form, has a boiling point of −152° C., and is dangerous to transport. Also, NO gas cannot be manipulated in the presence of oxygen and will attack most metals and plastics. Consequently, NO is a difficult gas to handle, and the constraints on its use are compounded by the fact that, generally, NO can only be purchased in relatively low-pressure cylinders, thereby making its storage and distribution quite cumbersome and relatively expensive.

Currently, NO is either prepared on-site or shipped in heavy stainless steel cylinders at a pressure of 500 psig. When prepared on site, sodium nitrite, which serves as the source of NO, is reacted with acidified iron sulfate to release NO gas, which then must be purified to remove higher oxides of nitrogen (Blanchard, *Inorg. Synth.*, 2, 126–128 (1946)). The method employs a rather large apparatus to contain the slurry of salts used in the reaction and to ensure that pure NO gas is obtained. This process suffers from several disadvantages, including the production of large volumes of highly acidic ($H_2SO_4$), iron-containing waste and concentrated alkaline waste, given that NaOH is used to remove $NO_2$ from the gas before use, and the inability to turn the gas generation on or off as desired.

The literature is replete with examples of compounds which can be manipulated to release NO; however, these manipulations have been generally designed for limited NO release under specialized conditions. Thus, these manipulations are generally unsuitable for the larger-scale production of NO for biological, pharmaceutical, chemical, and, particularly, industrial applications.

In particular, it has been found that many tissues in the body endogenously release NO (Marietta, *Chem. Res. in Toxicology*, 1(5), 249–257 (1988); Marietta, *Biochemistry*, 27, 8706–8711 (1988)). Also, it has been discovered that drugs, including xenobiotics, can be metabolized to give NO either as the effector molecule or as a harmful metabolite (Feelisch, *J. Cardiovasc. Pharmacol.*, 17, S25–S33 (1991); Ignarro et al., *Biochem. Biophys. Res. Comm.*, 94, 93–100 (1980); Servent et al., *Biochem. Biophys. Res. Comm.*, 163, 1210–1216 (1989); Haussmann et al., In: *Relevance of N-Nitroso Compounds to Human Cancer. Exposures and Mechanisms*, Bartsch, O'Neill and Schulte-Hermann, eds., IARC Sci. Pubs., 84, 109–112 (1987)). The nature of these manipulations to generate NO, while useful in certain biological processes, does not render these manipulations suitable for the generation of NO in many applications.

The reaction of NO with amines to produce salts of the structure $RR'N[N(O)NO^-]\cdot RR'NH_2^+$ has been known for many years (German Patent 1,085,166; Drago and Paulik, *J. Am. Chem. Soc.*, 82, 96–98 (1960); Drago and Karstetter, *J. Am. Chem. Soc.*, 83, 1819–1822 (1961); Drago et al., *J. Am. Chem. Soc.*, 83, 4337–4339 (1961); Longhi et al., *Inorg. Chem.*, 1, 768–770 (1962); Ragsdale et al., *Inorg. Chem.*, 4, 420–422 (1965)). The anionic portions of these salts spontaneously decompose in solution to regenerate NO (Ragsdale et al., Inorg. Chem., 4, 420–422 (1965); Maragos et al., *J. Med. Chem.*, 34, 3242–3247 (1991)). The more stable examples of these salts, in particular the diethylamine/ NO adduct (DEA/NO, wherein R=R'=ethyl) and the sodium salt of the isopropylamine/NO adduct (R=isopropyl and R'=H) have been previously isolated (Drago et al., *J. Am. Chem. Soc.*, 82, 96–98 (1960); Drago et al., *J. Am. Chem. Soc.*, 83, 1819–1822 (1961)). Although these salts have proven to be of value in biological studies where a controlled, gradual release of NO is required, these salts undergo slow decomposition even in the solid state unless stored at −78° C. and are thus unsuitable for the convenient storage and generation of NO gas in many applications.

Intermolecular salts have been prepared through the reaction of two diamines with NO (Longhi et al., supra). These compounds, however, were apparently not stable enough to give good combustion analyses and therefore are likely unsuitable for the storage and generation of NO gas.

U.S. Pat. Nos. 3,973,910, 3,996,002, 3,996,003, and 3,996,008 describe the generation of NO for the purpose of measuring the N-nitrosoamine content of a sample. The NO gas is generated by heating N-nitrosoamine compounds of formula $R_1R_2NNO$, wherein $R_1$ and $R_2$ are the same or different organic radicals, including those radicals which together with the nonnitroso N of N-NO constitute a nitrogen heterocyclic radical. The heat (200°–300° C.) reportedly breaks the N-NO bonds but not other molecular bonds, thereby releasing NO gas. This technique, however, requires significant energy in the form of heat to yield NO gas.

U.S. Pat. Nos. 4,256,462, 4,303,419, and 4,336,158 also describe the generation of NO for the purpose of measuring the N-nitrosoamine content of a sample. Instead of cleaving the N-NO bond by using heat energy, the N-NO bond is chemically cleaved. In particular, NO gas is generated by reacting denitrosating agents with N-nitrosoamines of formula $RR_1NNO$, wherein $R$ and $R_1$ may be organic or substituted organic moieties. The denitrosating agent is a mixture of glacial acetic acid and a concentrated inorganic acid, particularly phosphoric or sulfuric acid, in combination with an inorganic water-soluble bromide or iodide salt. This process, however, involves the undesirable use of significantly acidic components and halogen salts for the generation of NO gas. Moreover, the nitrosoamine-based methods for the generation of NO suffer from the disadvantages that the amount of NO contained in any nitrosoamine, as a percent by weight, is very small.

Yet another process for generating NO gas is disclosed in U.S. Pat. No. 5,094,815, which pertains to a process for the HPLC-chemiluminescence detection of N-nitroso compounds. In particular, nitric oxide is cleaved from the N-nitroso compounds by photolysis using ultraviolet radiation. This process, however, requires a specialized apparatus involving the use of a UV generator and is unsuitable for the large-scale production of NO gas.

It is an object of the present invention to provide a method for the convenient storage and generation of NO gas. It is another object of the present invention to provide a method for the controlled release of NO gas from an easily transportable source. It is a further object of the present invention to provide for the larger-scale production of NO gas in sufficient quantities for biological, pharmaceutical, chemical, and industrial uses. It is yet another object of the present invention to provide for the generation of NO gas without the need for the expenditure of considerable energy, the use of significant quantities of concentrated acids, or the requirement for elaborate apparatus, such as UV-generators and the like.

The present invention satisfies these long-standing needs for convenient NO storage, distribution, and generation and provides for the easy and inexpensive generation of NO gas in sufficient quantities for a variety of uses. These and other objects and advantages of the present invention, as well as additional inventive features, will be apparent from the description of the invention provided herein.

BRIEF SUMMARY OF THE INVENTION

The present invention provides a method for the generation of NO gas by exposing a zwitterionic polyamine/NO adduct to suitable conditions to effect release of NO, such as by contacting the adduct with an acidic solvent, water of neutral or slightly alkaline pH, or a suitable catalyst in an alkaline solvent. The zwitterionic polyamine/NO adduct has the structure $RN[N(O)NO^-](CH_2)_xNH_2^+R'$, wherein $R=C_1-C_6$ alkyl, $C_1-C_6$ aminoalkyl, or cyclohexyl, $R'=$hydrogen or $C_1-C_6$ alkyl, and $x=2–6$. More preferably, the zwitterionic polyamine/NO adduct is such that $R=$methyl, ethyl, propyl, isopropyl, cyclohexyl, $(CH_2)_2NH_2$, $(CH_2)_3NH_2$, or $(CH_2)_4NH_2$, $R'=$hydrogen, methyl, ethyl, propyl, or isopropyl, and $x=2–4$. The most preferred zwitterionic polyamine/NO adduct is N-methylethylenediamine, i.e., the compound wherein $R=CH_3$, $R'=H$, and $x=2$.

Upon exposure to suitable conditions, the zwitterionic polyamine/NO adducts will release NO gas for any suitable purpose, e.g., biological, pharmaceutical, chemical, and industrial applications. The zwitterionic polyamine/NO adducts can also be used in chemical processes wherein nitric oxide is generated in situ, by substituting an adduct for a reagent that produces nitric oxide in situ in a solvent in the chemical process. The zwitterionic polyamine/NO adducts used in the present inventive method are very stable solids and contain as much as 45% NO by weight, which is capable of being released in solution in amounts and at rates that vary predictably with structure.

DETAILED DESCRIPTION OF THE INVENTION

Figure 1:
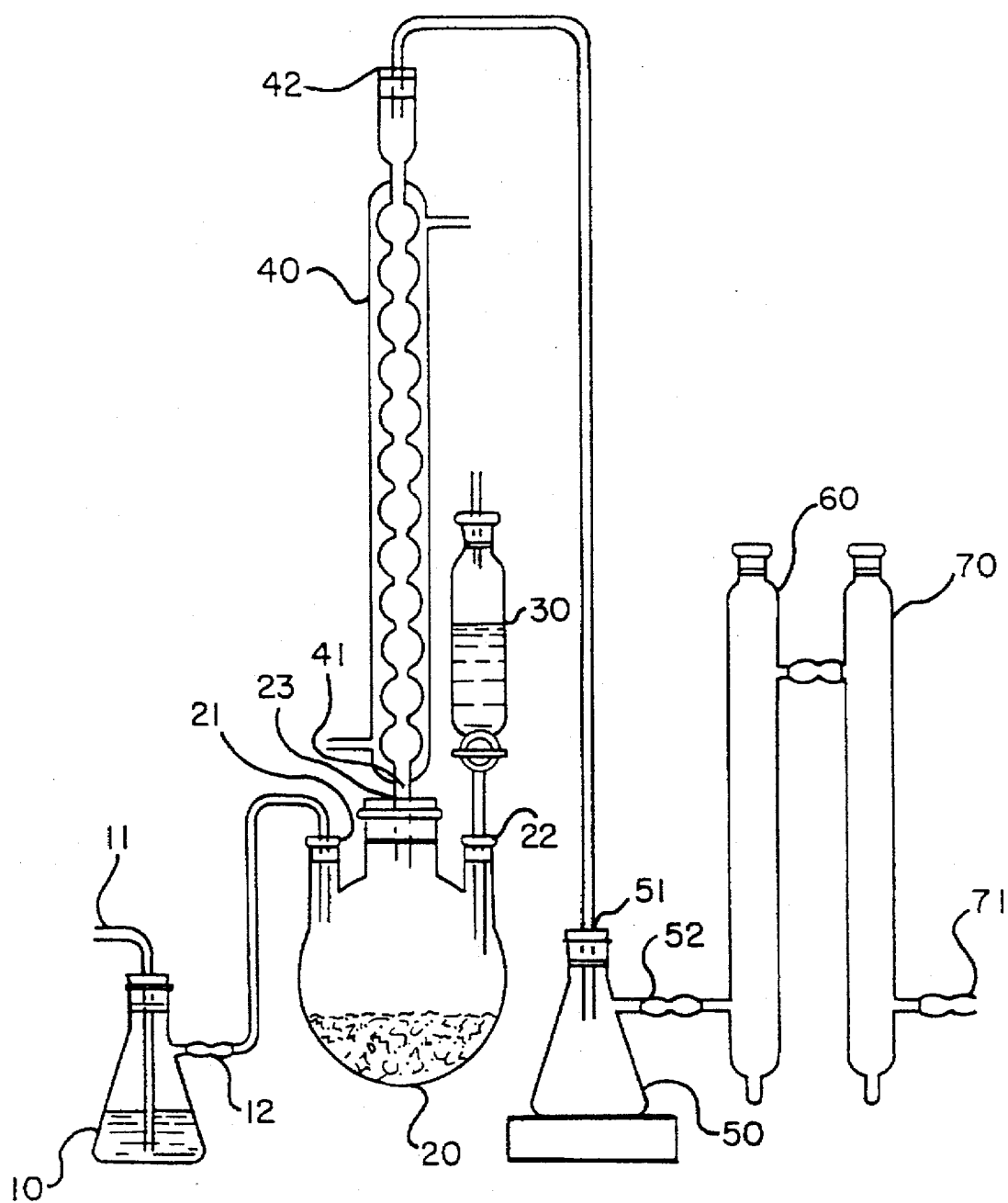
FIG. 1 shows a suitable apparatus useful in the generation of NO gas by the method of the present invention.

The present invention provides a method of generating NO gas. The method involves exposing a zwitterionic polyamine/NO adduct to suitable conditions to effect the release of NO, such as by contacting the adduct with an acidic solvent, water of neutral or slightly alkaline pH, or a suitable catalyst in an alkaline solvent. The zwitterionic polyamine/NO adduct has the formula $$RN[N(O)NO^-](CH_2)_xNH_2^+R' \qquad (I)$$

wherein $R=C_1-C_6$ alkyl, $C_1-C_6$ aminoalkyl, or cyclohexyl, $R'=$hydrogen or $C_1-C_6$ alkyl, and $x=2–6$. Preferred zwitterionic polyamine/NO adducts for use in the present inventive method are those of formula I, wherein $R=$methyl, ethyl, propyl, isopropyl, cyclohexyl, $(CH_2)_2NH_2$, $(CH_2)_3NH_2$, or $(CH_2)_4NH_2$, $R'=$hydrogen, methyl, ethyl, propyl, or isopropyl, and $x=2–4$. Most preferred for use in the present inventive method is the zwitterionic polyamine/NO adduct of formula I, wherein $R=CH_3$, $R'=H$, and $x=2$, namely the N-methylethylenediamine derivative of formula $CH_3N[N(O)NO^-](CH_2)_2NH_3^+$.

In general, those zwitterionic polyamine/NO adducts of low molecular weight are preferred since such adducts, as compared to higher molecular weight adducts, typically have a higher water-solubility and a higher % NO yield by weight. Also, the lower molecular weight adducts typically are less expensive and have lower molecular weight by-products after release of NO which can be more readily disposed. In addition, zwitterionic polyamine/NO adducts which are diamines and triamines are preferred inasmuch as adducts with fewer amine-groups will be generally less cross-reactive with other possible species.

The zwitterionic polyamine/NO adducts may be prepared by any suitable process. The synthesis of the NO adducts is described in U.S. Pat. No. 5,155,137, as well as in Example 1 herein.

The appropriate polyamines are preferably prepared first and then reacted with nitric oxide under suitable conditions to give the desired zwitterionic polyamine/NO adduct. Many of the polyamines needed to prepare NO adducts using such a synthesis route are commercially available (e.g., from Aldrich Chemical Co., Milwaukee, Wis.). Polyamines useful in preparing the NO adducts can also be synthesized utilizing procedures well known by those of ordinary skill in the art (see, e.g., Garrido et al., *J. Org. Chem.*, 49, 2021–2023 (1984); Bergeron, *Accts. Chem. Res.*, 19, 105–113 (1986); Bergeron et al., *J. Org. Chem.*, 49, 2997–3001 (1984); Bergeron et al., *J. Org. Chem.*, 53, 3108–3111 (1988); Carboni et al., *Tet. Lett.*, 29, 1279–1282 (1988)). The NO adducts can be prepared by reacting these suitable polyamines with nitric oxide in a method similar to that taught in Drago et al., *J. Am. Chem. Soc.*, 83, 1819–1822 (1961). It is generally important that the amine starting materials are uncontaminated by absorbed $CO_2$ so as to optimize reaction yields and the stability or shelf-life of the products. There does appear to be a preference for NO attachment at secondary amines. Compounds which have primary and secondary nitrogen sites will typically react with NO gas so as to primarily result in the production of secondary amine/NO adducts.

The use of dilute solutions in virtually any aprotic solvent will prevent the formation of intermolecular salts; however, more polar aprotic solvents may be necessary to prevent formation of alternative intermolecular products. For example, reaction of N-isopropyl-1,3-propanediamine with NO can result in the formation of either an intermolecular salt (isopropyl-N(O)NO$^-$(CH$_2$)$_3$NH$_2$.isopropyl-NH$_2^+$(CH$_2$)$_3$NH$_2$) or a zwitterion (isopropyl-N[N(O)NO$^-$](CH$_2$)$_3$NH$_3^+$). Mostly the salt (86%) forms in dilute ether solution, whereas mostly the zwitterion (96%) forms in dilute tetrahydrofuran (THF). The zwitterion forms exclusively in dilute acetonitrile. Not all of the polyamine/NO reactions exhibit such a dramatic variation with respect to the solvent used. Some of the polyamine/NO reactions form pure zwitterionic products in dilute ether solution. Given that the amines, themselves, are small polar protic molecules, which can alter the character of the solvent, acetonitrile is used as the solvent of choice, since reactions in this solvent appear to be less subject to complications arising from the effect of the amine on the character of the solvent.

Under an NO pressure of 70–80 psig, the zwitterionic polyamine/NO adducts used in the present inventive method form at room temperature in excellent yields with short (less than one day) reaction times. The NO adducts are stable as solids for weeks at room temperature in closed containers and yet will release NO rapidly in acidic solutions or more slowly in buffered near-neutral media.

Contacting a zwitterionic polyamine/NO adduct of formula I with an acidic solvent or water (neutral or even slightly alkaline) allows for the spontaneous release of NO gas as desired with no contamination by other oxides of nitrogen. There is no need to heat the solution, subject it to other reagents, or utilize UV-radiation to generate the NO gas. The acidic solvent may be any suitable organic solvent, preferably containing at least a minor amount of a mineral acid (e.g., hydrochloric acid, sulfuric acid, or the like) or a Lewis acid (e.g., CuBr$_2$ or the like). The acidic solvent is preferably only mildly acidic and has a pH of about 5 up to about 7. The water of slightly alkaline pH preferably has a pH of from about 7 to about 8. The solvent may be any suitable solvent which is capable of wetting the zwitterionic polyamine/NO adduct. It is not necessary that the adduct dissolve fully for NO to be produced, although full dissolution is preferable. The preferred solvent for the generation of NO is water.

The zwitterionic polyamine/NO adduct will also release NO gas when contacted with a suitable catalyst, such as copper, even in an alkaline solvent. Such catalyzed release of NO gas in an alkaline medium is particularly useful in the in situ generation and reaction of NO. For the in situ generation and reaction of NO, as set forth, for example, in Example 3 herein, the preferred solvent is acetonitrile, although other organic solvents (such as ether, tetrahydrofuran, and the like) will suffice.

The present invention also provides an improved method of carrying out a chemical process that employs a reagent that produces NO in situ in a solvent, wherein the improvement comprises substituting for the reagent a zwitterionic polyamine/NO adduct of formula I. For example, these zwitterionic polyamine/NO adducts can substitute for a reagent that acts via the production of a nonaqueous diazotizing agent and, in particular, can be useful substitutes for the sodium nitrite or alkyl nitrites in any one of the following reactions:

the Pschorr ring closure (Abramovitch, *Adv. Free-Radical Chem.*, 2, 87–138 (1966)) or modification thereof (Chauncy and Gellert, *Aust. J. Chem.*, 22, 993–995 (1969)), the Meerwein arylation reaction (Rondestvedt, *Org. Reactions*, 24, 225–259 (1976)) in its modern form (Doyle et al., *J. Org. Chem.*, 42, 2431–2436 (1977)), the preparation of monohalides from amines via an alternative to the Sandmeyer reaction (Brackman et al., *Recl. Trav. Chim. Pays-Bas*, 85, 857–864 (1966)), the preparation of dihalides using NO gas (Doyle et al., *J. Amer. Chem. Soc.*, 98, 1627–1629 (1976)), the preparation of monohalides using nitrosyl chloride generated in situ (Doyle et al., *J. Org. Chem.*, 43, 4120–4126 (1978)), and a deoximation reaction using either sodium or alkyl nitrites (Lee et al., *Tet. Lett.*, 31, 6677–6680 (1990)).

Those compounds which are most preferred for use in the present invention are those NO complexes which contain the highest percentage of NO by weight. Such complexes are formed from the lowest molecular weight amines. Especially preferred examples of these NO complexes are set forth in Table I.

TABLE I

| Compound | % NO By Wt. |
|---|---|
| CH$_3$N(N$_2$O$_2^-$)CH$_2$CH$_2$NH$_3^+$ | 44.7 |
| CH$_3$N(N$_2$O$_2^-$)CH$_2$CH$_2$NH$_2^+$CH$_3$ | 40.5 |
| CH$_3$CH$_2$N(N$_2$O$_2^-$)CH$_2$CH$_2$NH$_3^+$ | 40.5 |
| CH$_3$CH$_2$N(N$_2$O$_2^-$)CH$_2$CH$_3$·Na$^+$ | 38.7 |
| H$_2$NCH$_2$CH$_2$N(N$_2$O$_2^-$)CH$_2$CH$_2$NH$_3^+$ | 36.8 |
| EtN(N$_2$O$_2^-$)CH$_2$CH$_2$NH$_2^+$Et | 34.1 |

The NO complexes contain as much as 45% NO by weight and are capable of releasing NO in amounts and at rates that vary in a predictable way with structure. Accordingly, the selection of an appropriate zwitterionic polyamine/NO adduct allows for a wide range of desired NO generation rates to be achieved. The NO released from the various adducts can be very rapid, such as 1–2 minutes, or very slow, such as several days. An appropriate NO adduct, therefore, can be chosen for a desired rate of release for most applications.

In particular, the release rate of NO can be varied by altering the length of the alkyl chain separating the nitrogen atoms, i.e., the value of x in the general structural formula I of the zwitterionic polyamine/NO adducts of interest.

Generally, the rate of release of NO may be increased by increasing the value of x. For example, 1-hydroxy-2-oxo-3-(N-methyl-2-aminoethyl)-3-methyl-1-triazene, in which x=2, has a half-life of 36.1 min, whereas 1-hydroxy-2-oxo-3-(N-methyl-3-aminopropyl)-3-methyl-1-triazene, in which x=3, has a half-life of 10.1 min. This decrease in half-life is believed to be the result of the decreasing importance of hydrogen bonding as x increases.

The release rate of NO can be also varied by altering the size of the R group in the general formula I of the zwitterionic polyamine/NO adducts. For example, 1-hydroxy-2-oxo-3-(2-aminoethyl)-3-methyl-1-triazene, in which R is methyl, has a half-life of 40 min, whereas 1-hydroxy-2-oxo-3-(2-aminoethyl)-3-ethyl-1-triazene, in which R is ethyl, has a half-life of 333 min. In general, half-lives in buffered aqueous solution at pH 7.4 and 22° C. vary from extremely short (1.3 min for $MeN[N(O)NO^-](CH_2)_4NH_2^+Me$) to very long (56 h for $H_2NCH_2CH_2N[N(O)NO^-]CH_2CH_2NH_3^+$) with the longest half-lives being achieved by triamine/NO adducts, in particular 1-hydroxy-2-oxo-3,3-di(2-aminoethyl)-1-triazene which has a half-life over 200 times that of the diethylamine/NO adduct. Stabilization of the zwitterionic polyamine/NO adducts by the R group may be due to changes in the electron distribution within the $[N(O)NO^-]$ system.

When increasing the size of the R group to increase the stability of the NO adducts in solution, and thereby lengthen the half-lives of those NO adducts, it is important to take into consideration steric effects with respect to substitutions at the R group. If the R group is too large, the derivative which results may fail to react with NO under low pressure conditions and the desired NO adduct may be more difficultly prepared.

In contrast to R, R' does not appear to have any influence on half-life. For example, 1-hydroxy-2-oxo-3-(3-aminopropyl)-3-isopropyl-1-triazene (R=i-Pr, R'=H) and 1-hydroxy-2-oxo-3-(N-isopropyl-3-aminopropyl)-3-isopropyl-1-triazene (R=i-Pr, R'=i-Pr) have similar half-lives. 1-Hydroxy-2-oxo-3-(2-aminoethyl)-3-methyl-1-triazene (R=Me, R'=H) and 1-hydroxy-2-oxo-3-(N-methyl-2-aminoethyl)-3-methyl-1-triazene (R=Me, R'=Me) have similar half-lives. 1-Hydroxy-2-oxo-3-(2-aminoethyl)-3-ethyl-1-triazene (R=Et, R'=H) and 1-hydroxy-2-oxo-3-(N-ethyl-2-aminoethyl)-3-ethyl-1-triazene (R=Et, R'=Et) have similar half-lives. This lack of an effect may be due to the fact that R' is remote from the π electron system and is relatively incapable of exerting either a steric or electronic effect. Similarly, the presence of a tertiary amine group elsewhere in the molecule does not appear to have an effect on the half-life of the NO adducts.

The overall amount of NO released can be also varied by choice of adduct. For example, 1-hydroxy-2-oxo-3-(3-aminopropyl)-3-propyl-1-triazene, spermine/NO adduct, 1-hydroxy-2-oxo-3-(2-aminoethyl)-3-methyl-1-triazene, 1-hydroxy-2-oxo-3-(N-methyl-2-aminoethyl)-3-methyl-1-triazene, 1-hydroxy-2-oxo-3-(N-ethyl-2-aminoethyl)-3-ethyl-1-triazene, and 1-hydroxy-2-oxo-3,3-di(2-aminoethyl)-1-triazene all release two equivalents of NO at 22° C.

These zwitterionic polyamine/NO adducts, therefore, are particularly useful for the storage and generation of NO gas. These NO adducts are stable powders which may be shipped in glass or plastic bottles, in contrast to the steel cylinders used to ship NO gas. The NO adducts not only can be handled in air without fear of exposure to toxic vapor, they provide a remarkably compact storage medium for NO gas. For example, 1-hydroxy-2-oxo-3-(2-aminoethyl)-3-methyl-1-triazene is 45% NO by weight, and a 50 g bottle of this compound is equivalent to an entire lecture bottle of NO. In fact, 1-hydroxy-2-oxo-3-(2-aminoethyl)-3-methyl-1-triazene can be used in a Kipp type generator to produce a steady stream of NO in the same way that zinc is used in the production of hydrogen.

Thus, the present invention also provides for a kit for the generation of NO gas. Such a kit comprises one or more of the zwitterionic polyamine/NO adducts and a suitable apparatus for contacting an adduct with an appropriate solvent such as an acidic solvent or water. Such an apparatus will typically contain a reservoir to hold the adduct, a vessel in which to contact the adduct with solvent to effect generation of nitric oxide gas, means to direct the flow of the nitric oxide gas (such as appropriate tubing and valves), means for drying the nitric oxide gas (such as a drying tower or use of appropriate desiccants), means for preventing backflow (such as a check-valve), and means for measuring the output of the nitric oxide gas (such as a flowmeter). Preferably, such a kit includes a mildly acidic solvent or a more concentrated acid which can be diluted with water prior to contact with the adduct.

The following examples further illustrate the present invention and, of course, should not be construed as in any way limiting its scope.

EXAMPLE 1

This example illustrates the preparation of various zwitterionic polyamine/NO adducts for use in conjunction with the present invention by using different amines as starting materials in the following general procedure.

A Parr hydrogenation bottle was incorporated into a specially constructed reactor, which was modeled after the standard Parr 3911 hydrogenation apparatus (Parr Instrument Co., Moline, Ill.), because stainless steel is required for prolonged exposure to NO gas and amines degrade most types of stoppers and gaskets. The reservoir was replaced by a type 304 stainless steel gas sampling cylinder equipped with stainless steel fittings, which are available from any valve and fitting plumbing supply company. Diaphragm-seal, packless type valves (Aldrich), and stainless steel pressure gauges (Air Products) were employed. The Parr bottle, along with the usual Parr clamp, were used but were connected to the gas reservoir using a Teflon tube and were mounted so as to allow for stirring with a magnetic stirrer.

Unless otherwise indicated, amines were purchased from either Carbolabs, Inc. (Bethany, Conn.) or Aldrich Chemical Co. (Milwaukee, Wis.). Reaction solvents were anhydrous grade (Aldrich) but all others were reagent grade. NO was obtained from Matheson Gas Products and was used as received.

A solution of the appropriate amine in the desired solvent was placed into the standard Parr hydrogenation bottle. Nitrogen was passed through the apparatus and bubbled through the solution for 5–10 minutes. The bottle was clamped, and NO gas was admitted to a pressure of 5 atm. The solution was stirred for the indicated time with addition of NO as needed during the first 5–6 h to maintain the reservoir pressure. The reactions, which were neither heated nor cooled, appeared to warm only very slightly for the first hour, and then returned to room temperature. Excess NO was then vented, and $N_2$ was bubbled through the resulting white slurry for 5 min. The product was isolated by filtration, washed with the reaction solvent, washed with ether, and then dried in vacuo for several hours. All of the products were amorphous, voluminous powders which, except as indicated, were air-stable.

Analytical data were obtained using the products as isolated directly from the reaction mixtures. The NMR spectra of all compounds were obtained in $D_2O$ ($^1H$ at 200 MHz; $^{13}C$ at 50 MHz) at the natural pD of their solutions. Due to the finite time required for data acquisition, the $^{13}C$ spectra of the shorter half-lived compounds often displayed small peaks attributable to the parent amines, which are not set forth herein. Elemental analysis data for each of the compounds were also obtained and compared to the calculated values expected for such compounds.

Ultraviolet data were obtained in 0.01M NaOH to avoid this degradation problem. Melting points were obtained on a hot stage and are uncorrected. Kinetic data were obtained by diluting stock solutions (0.01M NaOH) of each compound with pH 7.4 phosphate buffer (0.1M) as needed to produce final solutions having compound concentrations in the range of 90–120 µM. The rate of NO release was determined by following the disappearance of the characteristic UV absorption ($\lambda_{max}$=250–252 nm), which all of these compounds exhibit. In each case, a plot of $1/(A-A_\infty)$ vs. time was linear and was used to calculate the rate constant. The temperature in the spectrophotometer cavity was 22°±2° C. and was not thermostated. Compound 14 was too stable to permit monitoring over a sufficient number of half-lives to guarantee the accuracy of the value obtained for its half-life. No mass spectral data are provided since these compounds display the spectra of the parent amines due to rapid dissociation in high vacuum. Elemental analyses were performed by Atlantic Microlab, Inc. (Norcross, Ga.). All compounds are named in the neutral form, which would result if the site of proton attachment was assumed to be the same as the preferred site of alkylation.

1-Hydroxy-2-oxo-3-(3-aminopropyl)-3-isopropyl-1-triazene (1). Prepared by treating N-isopropyl-1,3-propanediamine (10.0 g, 86.0 mmol) in 200 ml of THF with NO for 74 h. Yield 0.66 g (4.5%); mp 114°–115° C. dec; $^1H$ NMR δ 1.07 (6H, d, J=6.3 Hz), 1.68 (2H, m), 3.02–3.14 (4H, m), 3.22 (1H, septet, J=6.3 Hz); $^{13}C$ NMR δ 22.2, 27.2, 40.6, 50.1, 57.1.

Anal. Calc'd for $C_6H_{16}N_4O_2$: C, 40.90; H, 9.15; N, 31.79. Found: C, 40.98; H, 9.15; N, 31.79.

When this preparation was repeated using a solution of 10 g of the amine in 150 ml of ether and a 4 day reaction time, there was obtained 0.88 g of white solid, which NMR showed to be 86% intermolecular salt (isopropyl-N(O)NO⁻(CH₂)₃NH₂·isopropyl-NH₂(CH₂)₃NH₂). This material was not stable enough to obtain combustion analytical data. mp 98°–101° C. dec; $^1H$ NMR δ 1.07 (6H, d, J=6.3 Hz), 1.26 (6H, d, J=6.7 Hz), 1.68 (2H, m), 1.86 (2H, m), 2.87 (2H, t, J=7.3 Hz); 3.02–3.14 (6H, m), 3.16–3.35 (2H, m); $^{13}C$ NMR δ 21.7, 22.2, 27.2, 30.1, 40.5, 40.6, 45.4, 50.1, 53.0, 57.1.

1-Hydroxy-2-oxo-3-(N-methyl-2-aminoethyl)-3-methyl-1-triazene (2). Prepared by reacting N,N'-dimethylethylenediamine (5.00 g, 56.7 mmol) in 200 ml of THF with NO for 47 h. Yield 3.87 g (46%); mp 116°–117° C. dec; $^1H$ NMR δ 2.73 (3H, s), 2.82 (3H, s), 3.05 (2H, m, $M_2$ portion of an $AA'M_2$ system), 3.27 (2H, m, AA' portion of an $AA'M_2$ system); $^{13}C$ NMR δ 35.8, 44.9, 48.5, 53.1.

Anal. Calc'd for $C_4H_{12}N_4O_2$: C, 32.43; H, 8.17; N, 37.82. Found: C, 32.53; H, 8.23; N, 37.75.

1-Hydroxy-2-oxo-3-(N-methyl-3-aminopropyl)-3-methyl-1-triazene (3). Prepared by treating N,N'-dimethyl-1,3-propanediamine (9.78 g, 95.7 mmol) in 200 ml of THF with NO for 27 h. Yield 5.37 g (35%); mp 111°–112° C. dec; $^1H$ NMR δ 1.70 (2H, m), 2.68 (3H, s), 2.76 (3H, s), 3.00–3.13 (4H, m); $^{13}C$ NMR δ 25.8, 35.8, 45.3, 50.1, 54.4.

Anal. Calc'd for $C_5H_{14}N_4O_2$: C, 37.02; H, 8.69; N, 34.55. Found: C, 37.12; H, 8.74; N, 34.45.

1-Hydroxy-2-oxo-3-(N-methyl-4-aminobutyl)-3-methyl-1-triazene (4). Synthesized by reacting N,N'-dimethylputrescine (Pfaltz and Bauer, 5.00 g, 43.0 mmol) in 150 ml of $CH_3CN$ with NO for 23 h. Yield 6.47 g (85%); mp 112°–114° C. dec; $^1H$ NMR δ 1.40 (2H, m), 1.74 (2H, m), 2.67 (3H, s), 2.74 (3H, s), 2.97 (4H, m); $^{13}C$ NMR δ 26.0, 26.2, 35.6, 45.2, 51.7, 56.7.

Anal. Calc'd for $C_6H_{16}N_4O_2$: C, 40.90; H, 9.15; N, 31.79. Found: C, 41.18; H, 9.20; N, 31.63.

1-Hydroxy-2-oxo-3-(N-methyl-6-aminohexyl)-3-methyl-1-triazene (5). Synthesized by treating N,N'-dimethyl-1,6-hexanediamine (5.00 g, 34.7 mmol) in 150 ml of $CH_3CN$ with NO for 22 h. Yield 6.08 g (86%); mp 108°–110° C. dec; $^1H$ NMR δ 1.25–1.45 (6H, m), 1.55–1.72 (2H, m), 2.67 (3H, s), 2.72 (3H, s), 2.85–3.01 (4H, m); $^{13}C$ NMR δ 28.2 (2 C), 28.3, 28.4, 35.6, 45.1, 52.0, 57.3.

Anal. Calc'd for $C_8H_{20}N_4O_2$: C, 47.04; H, 9.86; N, 27.43. Found: C, 47.26; H, 9.94; N, 27.29.

1-Hydroxy-2-oxo-3-(2-aminoethyl)-3-methyl-1-triazene (6). Prepared by treating N-methylethylenediamine (10.0 g, 135 mmol) in 150 ml of $CH_3CN$ with NO for 27 h. Yield 14.8 g (82%); mp 115°–116° C. dec; $^1H$ NMR δ 2.82 (3H, s), 3.00 (2H, m, $M_2$ portion of an $AA'M_2$ system), 3.24 (2H, m, AA' portion of an $AA'M_2$ system); $^{13}C$ NMR δ 39.2, 45.0, 54.1.

Anal. Calc'd for $C_3H_{10}N_4O_2$: C, 26.86; H, 7.51; N, 41.77. Found: C, 27.10; H, 7.58; N, 41.80.

1-Hydroxy-2-oxo-3-(2-aminoethyl)-3-ethyl-1-triazene (7). Synthesized by treating N-ethylethylenediamine (5.00 g, 56.7 mmol) in 150 ml of $CH_3CN$ with NO for 26 h. Yield 5.51 g (66%); mp 105°–106° C. dec; $^1H$ NMR δ 0.99 (3H, t, J=7.1 Hz), 2.97–3.08 (4H, m), 3.25 (2H, m, AA' portion of an $AA'M_2$ system); $^{13}C$ NMR δ 14.0, 39.2, 51.5, 53.0.

Anal. Calc'd for $C_4H_{12}N_4O_2$: C, 32.43; H, 8.17; N, 37.82. Found: C, 32.52; H, 8.19; N, 37.88.

1-Hydroxy-2-oxo-3-(N-ethyl-2-aminoethyl)-3-ethyl-1-triazene (8). Prepared by reacting N,N'-diethylethylenediamine (5.00 g, 43.0 mmol) in 150 ml of $CH_3CN$ with NO for 21 h. Yield 6.80 g (90%); mp 127°–128° C. dec; $^1H$ NMR δ 0.99 (3H, t, J=7.1 Hz), 1.29 (3H, t, J=7.3 Hz), 2.97–3.08 (4H, m), 3.11 (2H, q, J=7.3 Hz), 3.27 (2H, m, AA' portion of an $AA'M_2$ system); $^{13}C$ NMR δ 13.4, 13.9, 45.8, 46.5, 51.5, 52.1.

Anal. Calc'd for $C_6H_{16}N_4O_2$: C, 40.90; H, 9.15; N, 31.79. Found: C, 41.00; H, 9.23; N, 31.73.

1-Hydroxy-2-oxo-3-(3-aminopropyl)-3-methyl-1-triazene (9). Prepared by treating N-methyl-1,3-propanediamine (10.0 g, 113 mmol) in 150 ml of $CH_3CN$ with NO for 22 h. Yield 15.9 g (94%); mp 117°–118° C. dec; $^1H$ NMR δ 1.61 (2H, m), 2.76 (3H, s), 3.02 (2H, t, J=4.8 Hz), 3.07 (2H, t, J=6.7 Hz); $^{13}C$ NMR δ 27.1, 40.5, 45.3, 54.5.

Anal. Calc'd for $C_4H_{12}N_4O_2$: C, 32.43; H, 8.17; N, 37.82. Found C, 32.57; H, 8.23; N, 37.59.

1-Hydroxy-2-oxo-3-(N-ethyl-3-aminopropyl)-3-ethyl-1-1-triazene (10). Synthesized by reacting N,N'-diethyl-1,3-propanediamine (5.00 g, 38.4 mmol) in 150 ml of $CH_3CN$ with NO for 24 h. Yield 6.71 g (92%); mp 114°–116° C. dec; $^1H$ NMR δ 0.97 (3H, t, J=7.2 Hz), 1.27 (3H, t, J=7.3 Hz), 1.71 (2H, m), 2.96 (2H, q, J=7.2 Hz), 3.00–3.14 (6H, m); $^{13}C$ NMR δ 13.4, 13.8, 25.8, 45.7, 48.0, 51.7, 53.5.

Anal. Calc'd for $C_7H_{18}N_4O_2$: C, 44.19; H, 9.54; N, 29.45. Found: C, 44.23; H, 9.47; N, 29.39.

1-Hydroxy-2-oxo-3-(3-aminopropyl)-3-propyl-1-triazene (11). Prepared by treating N-propyl-1,3-propanediamine (10.0 g, 86.1 mmol) in 300 ml of $CH_3CN$ with NO for 23 h. Yield 12.4 g (82%); mp 98°–99° C. dec; $^1H$ NMR δ 0.90 (3H, t, J=7.3 Hz), 1.34 (2H, sextet, $J_1=J_2=7.3$ Hz), 1.69 (2H, quintet, $J_3=J_4=6.8$ Hz), 2.88 (2H, t, J=7.3 Hz), 3.03 (2H, t, J=6.8 Hz), 3.06 (2H, t, J=6.8 Hz); $^{13}C$ NMR δ 13.6, 22.3, 26.9, 40.6, 53.8, 58.9.

Anal. Calc'd for $C_6H_{16}N_4O_2$: C, 40.90; H, 9.15; N, 31.79. Found: C, 40.93; H, 9.21; N, 31.85.

1-Hydroxy-2-oxo-3-(N-isopropyl-3-aminopropyl)-3-isopropyl-1-triazene (12). Prepared by reacting N,N'-diisopropyl-1,3-propanediamine (5.00 g, 31.6 mmol) in 150 ml of $CH_3CN$ with NO for 42 h. Yield 3.52 g (51%); mp 114°–116° C. dec; $^1H$ NMR δ 1.07 (6H, d, J=6.2 Hz), 1.30 (6H, d, J=6.4 HZ), 1.67 (2H, m), 3.06–3.14 (4H, m), 3.22 (1H, septet, J=6.2 Hz), 3.38 (1H, septet, J=6.4 Hz); $^{13}C$ NMR δ 21.1 (2 C), 22.2 (2 C), 26.1, 45.8, 50.1, 53.4, 57.1.

Anal. Calc'd for $C_9H_{22}N_4O_2$: C, 49.52; H, 10.16; N, 25.66. Found C, 49.59; H, 10.21; N, 25.59.

1-Hydroxy-2-oxo-3-(3-aminopropyl)-3-cyclohexyl-1-triazene (13). Prepared by reacting N-cyclohexyl-1,3-propanediamine (5.00 g, 32.0 mmol) in 150 ml of $CH_3CN$ with NO for 42 h. Yield 4.06 g (59%); mp 116°–117° C. dec; $^1$NMR δ 1.05–1.38 (5H, m), 1.55–1.80 (7H, m), 2.88 (1H, m), 2.98–3.15 (4H, m); $^{13}C$ NMR δ 27.0 (2 C), 27.1, 28.1, 32.5 (2 C), 40.7, 49.6, 64.4.

Anal. Calc'd for $C_9H_{20}N_4O_2$: C, 49.98; H, 9.32; N, 25.91. Found: C, 50.54; H, 9.43; N, 25.41.

1-Hydroxy-2-oxo-3,3-di (2-aminoethyl)-1-triazene (14). Prepared by treating diethylenetriamine (5.00 g, 48.5 mmol) in 150 ml of $CH_3CN$ with NO for 23 h. Yield 7.14 g (90%); mp 109°–110° C. dec; $^1H$ NMR δ 2.82 (4H, m, $M_2$ portion of an AA'$M_2$ system), 3.18 (4H, m, AA' portion of an AA'$M_2$ system), $^{13}C$ NMR δ 39.7 (2 C), 55.8 (2 C) .

Anal. Calc'd for $C_4H_{13}N_5O_2$: C, 29.44, H, 8.03; N, 42.92. Found: C, 29.50; H, 8.05; N, 42.96.

1-Hydroxy-2-oxo-3,3-di(3-aminopropyl)-1-triazene (15). Prepared by reacting 3,3'-iminobispropylamine (5.00 g, 38.1 mmol) in 150 ml of $CH_3CN$ with NO for 23 h. Yield 6.87 g (94%); mp 99°–100° C. dec; $^1H$ NMR δ 1.60 (4H, tt, J=7.0, 7.3 Hz), 2.88 (4H, t, J=7.3 Hz), 3.00 (4H, t, J=7.0 Hz); $^{13}C$ NMR δ 29.1 (2 C), 40.8 (2 C), 54.2 (2 C).

Anal. Calc'd for $C_6H_{17}N_5O_2$: C, 37.69; H, 8.96; N, 36.62. Found: C, 37.59; H, 8.97; N. 36.52.

1-Hydroxy-2-oxo-3-(3-aminopropyl)-3-(4-aminobutyl)-1-triazene (16). Prepared by treating spermidine (5.00 g, 34.4 mmol) in 150 ml of $CH_3CN$ with NO for 23 h and isolating the hygroscopic product by the usual method but in a glove bag under $N_2$. Yield 6.19 g (88%); mp 92°–94° C. dec; $^1H$ NMR δ 1.32–1.47 (2H, m), 1.51–1.71 (4H, m), 2.79–2.88 (4H, m), 2.91–3.02 (4H, M); $^{13}C$ NMR δ 26.0, 29.0, 29.7, 40.9, 42.5, 54.3, 56.3.

Anal. Calc'd for $C_7H_{19}N_5O_2$: C, 40.96; H, 9.33; N, 34.12. Found C, 40.91; H, 9.40; N, 34.05.

The ultraviolet and kinetic data for compounds 1–16 were obtained as previously detailed and are set forth in Table II below.

TABLE II

Synthesized Zwitterions of the Form
$RN[N(O)NO^-](CH_2)_xNH_2^+R'$

| Cmpd | x | R | R' | UV $\lambda_{max}$ (nm)[a] | $\epsilon \times 10^{-3}$ ($M^{-1}cm^{-1}$)[a] | $t_{1/2}$ (min)[b] |
|---|---|---|---|---|---|---|
| 1 | 3 | i-Pr | H | 250 | 7.44 | 93.0 |
| 2 | 2 | Me | Me | 250 | 7.31 | 36.1 |
| 3 | 3 | Me | Me | 250 | 7.68 | 10.1 |
| 4 | 4 | Me | Me | 250 | 8.59 | 1.3 |
| 5 | 6 | Me | Me | 250 | 7.25 | 2.7 |
| 6 | 2 | Me | H | 252 | 7.80 | 40 |
| 7 | 2 | Et | H | 252 | 7.96 | 333 |
| 8 | 2 | Et | Et | 252 | 7.61 | 327 |
| 9 | 3 | Me | H | 250 | 7.77 | 13.7 |
| 10 | 3 | Et | Et | 250 | 8.55 | 71.8 |
| 11 | 3 | Pr | H | 250 | 8.05 | 76.6 |
| 12 | 3 | i-Pr | i-Pr | 250 | 7.89 | 88.5 |
| 13 | 3 | cyclohexyl | H | 250 | 9.13 | 115 |
| 14 | 2 | $(CH_2)_2NH_2$ | H | 252 | 7.64 | 3,400 |
| 15 | 3 | $(CH_2)_3NH_2$ | H | 252 | 7.86 | 284 |
| 16 | 3 | $(CH_2)_4NH_2$ | H | 250 | 9.42 | 165 |

[a]Measured in 0.01M NaOH
[b]Determined at 22° C. and pH 7.4 in 0.1M phosphate buffer

EXAMPLE 2

This example describes a preferred method of releasing NO gas from various zwitterionic polyamine/NO adducts.

NO gas was generated from compounds 2, 6, 10, 11, and 14 of Example 1, as well as $H_2N(CH_2)_3N[N(O)NO^-](CH_2)_4NH(CH_2)_3NH_3^+$, using the procedure set forth below. The percent NO yield was then calculated for each of these NO adducts.

Each of these complexes was used to generate NO gas utilizing the apparatus shown in FIG. 1. The apparatus comprises a first vessel 10 having an inlet 11 and an outlet 12 and contains mineral oil (or other heavy liquid) to prevent backflow. The outlet 12 of vessel 10 is connected to a first inlet 21 of second vessel 20, which also has a second inlet 22 and an outlet 23. The second vessel 20 contained either the solid NO complex or an aqueous solution of the NO complex. An addition funnel 30 is connected to the second inlet 22 of second vessel 20 so as to provide a means of introducing dilute aqueous HCl into second vessel 20. The outlet 23 of second vessel 20 is connected to the inlet 41 of condenser 40, and the outlet 42 of condenser 40 is connected to the inlet 51 of third vessel 50. The condenser 40 and third vessel 50 function to capture any mist carried through the apparatus in the gas stream. The outlet 52 of third vessel 50 is connected to drying towers 60 and 70 which contain desiccant such as calcium chloride or molecular sieves and contain an outlet 71 for gas passage.

In use, nitrogen gas was passed through the apparatus through the inlet 11 of first vessel 10 to flush oxygen from the apparatus. Acidic solution was then introduced into second vessel 20 by way of addition funnel 30, and NO gas was generated in second vessel 20. The thus generated NO gas flowed through the outlet 23 of second vessel 20, through the condenser 40, into the third vessel 50, into the drying towers 60 and 70, and out the condenser outlet 71.

The NO gas released through the outlet 71 of drying column 70 was fed into a thermal energy analyzer (TEA), which generates a signal proportional to the quantity of NO gas present. The yield of NO gas, as a weight percent of the theoretical maximum, obtained for each of the compounds tested isgiven in Table III.

TABLE III

| Compound | % NO Yield |
| --- | --- |
| $CH_3N[N(O)NO^-]CH_2CH_2NH_2{}^+CH_3$ | 98 |
| $H_2NCH_2CH_2N[N(O)NO^-]CH_2CH_2NH_3{}^+$ | 97 |
| $EtN[N(O)NO^-]CH_2CH_2CH_2NH_2{}^+Et$ | 100 |
| $CH_3N[N(O)NO^-]CH_2CH_2NH_3{}^+$ | 110* |
| $CH_3CH_2CH_2N[N(O)NO^-]CH_2CH_2CH_2NH_3{}^+$ | 110* |
| $H_2N(CH_2)_3N[N(O)NO^-](CH_2)_4NH(CH_2)_3NH_3{}^+$ | 95 |

*Values greater than 100% result when the gas release is slow, resulting in some drift in the instrument's baseline being included in the integration.

In a separate series of experiments, the generated gas was also collected in a gas buret and the yields were measured volumetrically. Yields ranged from 70–90% of theoretical. For example, when 1.0 g of $CH_3N(N_2O_2{}^-)CH_2CH_2NH_3{}^+$ was added to 5 ml concentrated $H_2SO_4$, 285 ml NO gas (85%) was trapped in the buret.

EXAMPLE 3

This example illustrates the use of a zwitterionic polyamine/NO adduct in a chemical process, specifically the conversion of 2,3-dimethylaniline to 3-bromo-o-xylene.

A solution of 44.67 g $CuBr_2$ (0.20 mole) in 300 ml $Ch_3CN$ was cooled in an ice bath and 8.5 g $Ch_3N(N_2O_2{}^-)CH_2CH_2NH_3{}^+$ (0.063 mole) were added. Then 18.2 g 2,3-dimethylaniline (0.15 mole) were added, and the resulting solution was stirred, while an additional 4.0 g $CH_3N(N_2O_2{}^-)CH_2CH_2NH_3{}^+$ were added in portions over 2 hours. The reaction was allowed to warm to room temperature and was stirred for 20 hours. The solution was acidified with 2N HCl and extracted with pentane. The combined organic layers were dried over $MgSO_4$, filtered through a short column of alumina, and distilled to yield 8.2 g (30%) of 3-bromo-o-xylene.

EXAMPLE 4

This example illustrates the extended shelf-life and long-term stability of the zwitterionic polyamine/NO adducts used in the present invention.

Samples of compound 11 of Example 1 were stored in a refrigerator over the course of several months. Combustion analysis data were obtained several times over the course of the storage period, and no change in elemental composition was observed during that time.

All publications, patents, and patent applications cited herein are hereby incorporated by reference to the same extent as if each individual document were individually and specifically indicated to be incorporated by reference and were set forth in its entirety herein.

While this invention has been described with emphasis upon preferred embodiments, it will be obvious to those of ordinary skill in the art that the preferred embodiments may be varied. It is intended that the invention may be practiced otherwise than as specifically described herein.

What is claimed is:

1. A method of generating NO gas ex vivo, which method comprises contacting a zwitterionic polyamine/NO adduct of structure $RN[N(O)NO^-](CH_2)_xNH_2{}^+R'$, wherein $R=C_1-C_6$ alkyl, $C_1-C_6$ aminoalkyl, or cyclohexyl, $R'$=hydrogen or $C_1-C_6$ alkyl, and x=2–6, with a solvent, said solvent having sufficient protonating ability to cause the release of NO from said zwitterionic polyamine/NO adduct.

2. The method of claim 1, wherein R=methyl, ethyl, propyl, isopropyl, cyclohexyl, $(CH_2)_2NH_2$, $(CH_2)_3NH_2$, or $(CH_2)_4NH_2$, $R'$=hydrogen, methyl, ethyl, propyl, or isopropyl, and x=2–4.

3. The method of claim 2 wherein $R=CH_3$, $R'$=H, and x=2.

4. The method of claim 1, wherein said solvent has a pH of about 5 to about 7.

5. The method of claim 1, wherein said solvent is water and has a pH of about 7 to about 8.

6. The method of claim 1, wherein said solvent is nonaqueous organic.

7. A method of carrying out ex vivo a chemical process employing a reagent that produces nitric oxide in situ in a solvent, wherein the improvement comprises substituting said reagent with a zwitterionic polyamine/NO adduct of structure $RN[N(O)NO^-](CH_2)_xNH_2{}^+R'$, wherein $R=C_1-C_6$ alkyl, $C_1-C_6$ aminoalkyl, or cyclohexyl, $R'$=hydrogen or $C_1-C_6$ alkyl, and x=2–6.

8. The method of claim 7, wherein R=methyl, ethyl, propyl, isopropyl, cyclohexyl, $(CH_2)_2NH_2$, $(CH_2)_3NH_2$, or $(CH_2)_4NH_2$, $R'$=hydrogen, methyl, ethyl, propyl, or isopropyl, and x=2–4.

9. The method of claim 8, wherein $R=CH_3$, $R'$=H, and x=2.

10. The method of claim 7, wherein said reagent acts via the production of a nonaqueous diazotizing agent.

11. The method of claim 7, wherein said reagent is a sodium nitrite or an alkyl nitrite.

12. The method of claim 7, wherein said chemical process is selected from the group consisting of a Pschorr ring closure or modification thereof, a Meerwein arylation reaction or modification thereof, a process of preparing a monohalide from an amine via a Sandmeyer reaction or modification thereof, a process of preparing a dihalide using NO gas, a process of preparing a monohalide using nitrosyl chloride generated in situ, and a deoximation reaction using either a sodium or an alkyl nitrite.

* * * * *